United States Patent
Schaeffer et al.

(10) Patent No.: US 10,179,308 B2
(45) Date of Patent: Jan. 15, 2019

(54) ON-BOARD INERT GAS GENERATING SYSTEM PROGNOSTIC HEALTH MONITORING

(71) Applicant: Carleton Life Support Systems Inc., Davenport, IA (US)

(72) Inventors: Jeremy Schaeffer, Walcott, IA (US); Jesse Peterson, Blue Grass, IA (US); William Vestal, Milan, IL (US); Abdullah Al-Yafawi, North Liberty, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 0 days.

(21) Appl. No.: 15/486,742

(22) Filed: Apr. 13, 2017

(65) Prior Publication Data

US 2017/0296965 A1    Oct. 19, 2017

Related U.S. Application Data

(60) Provisional application No. 62/322,179, filed on Apr. 13, 2016.

(51) Int. Cl.
*B01D 53/22* (2006.01)
*B01D 53/30* (2006.01)
(Continued)

(52) U.S. Cl.
CPC .............. *B01D 53/30* (2013.01); *B01D 37/04* (2013.01); *B01D 2259/4575* (2013.01); *G05D 11/135* (2013.01)

(58) Field of Classification Search
CPC .......... G05D 11/135; B01D 2259/4575; B01D 53/30; B01D 37/04; B01D 53/24; B01D 2257/104; B01D 53/22
See application file for complete search history.

(56) References Cited

U.S. PATENT DOCUMENTS 4,093,429 A * 6/1978 Siegler ............... B01D 53/0423
                                                     95/105
5,169,419 A * 12/1992 Mori .................. B01D 53/0454
                                                    96/117.5
(Continued)

FOREIGN PATENT DOCUMENTS

EP          2623159        7/2013
GB          2499577        8/2013
(Continued)

OTHER PUBLICATIONS

Wang, Xiaoyang, Aircraft Fuel System Prognostics and Health Management, 2012, Cranfield University, https://dspace.lib.cranfield.ac.uk/bitstream/1826/7214/1/Wang_Xiaoyang_Thesis_2011.pdf.

(Continued)

*Primary Examiner* — Anthony R Shumate
(74) *Attorney, Agent, or Firm* — Woods Oviatt Gilman LLP; Katherine H. McGuire, Esq.

(57) ABSTRACT

A system for calculating maintenance predictions and making improvements to performance deficiencies to one or more components in an on-board inert gas generating system (OBIGGS) is described. The OBIGGS components include an ozone converter, heat exchanger, inlet filter, and Air Separation Module (ASM). The system comprises a prognostic health monitoring (PHM) sensor network comprising at least one respective sensor coupled to each of the components of the OBIGGS. Each at least one respective sensor is configured to output a respective data signal corresponding to a performance condition of a respective component. A control unit is operatively coupled to each component and signally coupled to each respective sensor of the PHM sensor network. The control unit includes at least one test condition algorithm configured to analyze the respective (Continued)

data signal to calculate the maintenance prediction for the respective component.

5 Claims, 12 Drawing Sheets

(51) Int. Cl.
  *B01D 37/04* (2006.01)
  *G05D 11/13* (2006.01)

(56) References Cited

U.S. PATENT DOCUMENTS

| | | | |
|---|---|---|---|
| 5,328,597 A * | 7/1994 | Boldt, Jr. | A45C 11/005 |
| | | | 116/264 |
| 5,334,237 A * | 8/1994 | Lorimer | B01D 53/0454 |
| | | | 95/25 |
| 6,491,739 B1 | 12/2002 | Crome et al. | |
| 6,634,598 B2 | 10/2003 | Susko | |
| 6,904,930 B2 | 6/2005 | Susko | |
| 7,013,905 B2 | 3/2006 | Jones et al. | |
| 7,081,153 B2 | 7/2006 | Leigh et al. | |
| 7,306,644 B2 | 12/2007 | Leigh et al. | |
| 7,352,464 B2 | 4/2008 | Chen et al. | |
| 7,481,237 B2 | 1/2009 | Jones et al. | |
| 7,574,894 B2 | 8/2009 | Austerlitz et al. | |
| 8,667,977 B1 | 3/2014 | McCaul et al. | |
| 9,016,078 B2 | 4/2015 | Gupta | |
| 9,102,416 B1 | 8/2015 | Cutler | |
| 2002/0060191 A1 * | 5/2002 | Sutton | B01D 35/143 |
| | | | 210/741 |
| 2005/0143956 A1 | 6/2005 | Long et al. | |
| 2005/0229968 A1 | 10/2005 | Jones et al. | |
| 2006/0186057 A1 * | 8/2006 | Verhagen | B01D 37/04 |
| | | | 210/739 |
| 2007/0025179 A1 * | 2/2007 | Hildreth | B01F 1/0016 |
| | | | 366/136 |
| 2008/0047586 A1 * | 2/2008 | Loldj | B01D 53/30 |
| | | | 134/18 |
| 2008/0048603 A1 | 2/2008 | Discenzo | |
| 2009/0092001 A1 * | 4/2009 | Hildreth | B01F 1/0016 |
| | | | 366/132 |
| 2011/0268639 A1 * | 11/2011 | White | B01D 53/30 |
| | | | 423/240 S |
| 2014/0238501 A1 | 8/2014 | Tichborne et al. | |
| 2014/0326134 A1 * | 11/2014 | Frankel | B01D 53/0415 |
| | | | 95/25 |
| 2014/0331857 A1 | 11/2014 | Massey et al. | |
| 2015/0000523 A1 * | 1/2015 | Jojic | B01D 53/228 |
| | | | 95/54 |
| 2015/0219554 A1 | 8/2015 | Hedges et al. | |
| 2015/0333347 A1 * | 11/2015 | Brunaux | A62C 3/08 |
| | | | 429/446 |
| 2017/0014774 A1 * | 1/2017 | Daniello | B64D 37/32 |

FOREIGN PATENT DOCUMENTS

| | | |
|---|---|---|
| JP | 2001206294 | 7/2001 |
| WO | 2011005946 | 1/2011 |

OTHER PUBLICATIONS

Cavage, William M., et al., Development and Testing of the FAA Simplified Fuel Tank Inerting System, https://www.fire.tc.faa.gov/2004Conference/files/fuel/B.Cavage_Simplified_fuel_tank_inerting_system.pdf.
Burns, Michael, et. al., Flight-Testing of the FAA Onboard Inert Gas Generation System on an Airbus A320, Office of Aviation Research, Federal Aviation Administration, 2004, https://www.fire.tc.faa.gov/pdf/03-58.pdf.

* cited by examiner

US 10,179,308 B2

ON-BOARD INERT GAS GENERATING SYSTEM PROGNOSTIC HEALTH MONITORING

FIELD OF THE INVENTION

The present invention relates generally to inert gas generating systems, such as those used on-board aircraft, and more particularly, to an on-board inert gas generating system (OBIGGS) and methods for monitoring the OBIGGS, and still more particularly to an OBIGGS and methods employing prognostic health monitoring (PHM) of OBIGGS components and processes.

BACKGROUND OF THE INVENTION

Prognostic health monitoring (PHM) may be used to predict when a system or component within the system ceases to perform as intended. When applied to aircraft systems, PHM may enable real-time transformation of system data into maintenance predictions during flight operations (e.g., cleaning or replacement notifications) to improve aircraft reliability and help lower operation expenses. PHM may additionally improve performance deficiencies of inerting systems such as, for example, the on-board inert gas generating system (OBIGGS), due to degradation of the air separation efficiency of an air separation module (ASM) or other system components. Such monitoring may improve overall OBIGGS performance and extend operating lifetime. For instance, improved ASM efficiencies may be achieved through the input of inlet air at a higher airflow rate and/or higher temperature, thereby regenerating the ASM to at or near pre-contamination performance levels.

Thus, there is a need for a system and method which incorporates PHM into an aircraft OBIGGS to monitor system performance and predict maintenance needs. In one example, PHM may promote OBIGGS control of ASM inlet air temperature and/or airflow rate to regenerate ASM performance and extend ASM lifetime. Additional examples may enable monitoring of other OBIGGS components to aid in determining remaining operational lifetimes of those components.

SUMMARY OF THE INVENTION

The present invention is generally directed to a system for calculating maintenance predictions and making improvements to performance deficiencies to one or more components in an on-board inert gas generating system (OBIGGS). The OBIGGS components include an ozone converter, heat exchanger, inlet filter, and Air Separation Module (ASM) each fluidly coupled via a flow path. The ozone converter is configured to remove ozone gas from an inlet gas. The heat exchanger is configured to adjust the temperature of the inlet gas. The inlet filter is configured to filter at least a portion of contaminants from the inlet gas, and the ASM comprises a hollow-fiber membrane configured to separate constituents within the inlet gas and produce a volume of inert gas for delivery to a downstream fuel tank. The system comprises a prognostic health monitoring (PHM) sensor network comprising at least one respective sensor coupled to each of the components of the OBIGGS. Each at least one respective sensor is configured to output a respective data signal corresponding to a performance condition of a respective component. A control unit is operatively coupled to each component and signally coupled to each respective sensor of the PHM sensor network. The control unit includes at least one test condition algorithm configured to analyze the respective data signal to calculate the maintenance prediction for the respective component.

In accordance with another aspect of the present invention, the at least one test condition algorithm includes an empirical curve fit corresponding to a predicted performance lifetime of each respective component. The algorithm is configured to extrapolate the respective data signal to estimate remaining component operating hours before component failure. The control unit may generate a notification if the estimated remaining component operating hours is less than a predetermined period of time.

In a further aspect of the present invention, the present invention may be directed to a method for calculating maintenance predictions and making improvements to performance deficiencies to one or more components in an on-board inert gas generating system (OBIGGS). The OBIGGS components include an ozone converter, heat exchanger, inlet filter, and Air Separation Module (ASM) each fluidly coupled via a flow path. The ozone converter is configured to remove ozone gas from an inlet gas while the heat exchanger is configured to adjust the temperature of the inlet gas. The inlet filter is configured to filter at least a portion of contaminants from the inlet gas and the ASM comprises a hollow-fiber membrane configured to separate constituents within the inlet gas and produce a volume of inert gas for delivery to a downstream fuel tank. A prognostic health monitoring (PHM) sensor network comprises at least one respective sensor coupled to each of the components of the OBIGGS. Each at least one respective sensor is configured to output a respective data signal corresponding to a performance condition of a respective component. A control unit is operatively coupled to each component and signally coupled to each respective sensor of the PHM sensor network. The control unit includes at least one test condition algorithm configured to analyze the respective data signal to calculate the maintenance prediction for the respective component. The method comprises populating the control unit with the at least one test condition algorithm with the at least one test condition algorithm including a respective component performance equation and associated performance empirical curve fit corresponding to component performance lifetime; through the control unit, receiving the respective data signal corresponding to the performance condition of the respective component; and through the at least one test condition algorithm, comparing the performance condition to the empirical curve fit to calculate an estimated number remaining component operating hours for the respective component.

In a further aspect of the present invention, the method may further comprise through the control unit, generating a notification if the estimated number remaining component operating hours is less than a predetermined period of time.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Fuel tank inerting systems (e.g., OBIGGS) may be found within aircraft airframes, as well as the frames of ground and water-borne vehicles. These inerting systems decrease the probability of internal fuel tank combustion by providing a sufficient amount of inert gas (e.g., nitrogen) to the fuel tank ullage to dilute any potential combustible gas mixture.

As discussed in greater detail below, prognostics health monitoring (PHM) sensors may monitor selected components of the OBIGGS. The monitored data may then be collected and analyzed by a diagnostic program running on a system control unit or by an operator viewing a display. The data may enable predicting when cleaning and/or maintenance may be required on any one or more of the components within the OBIGGS. Whenever predictions indicate cleaning or replacement is within the near future (such as less than about 100 hours of flight time), the control unit may send a signal that in turn generates a notification to the aircraft crew, maintenance crew, and/or other associated group. In this manner, PHM may provide for more efficient improvements to aircraft reliability as well as help lower operation expenses.

In a further aspect of the present invention, monitoring of the OBIGGS components through PHM may also lead to the real-time correction of performance deficiencies of indicated components. By way of example, and as further described within U.S. patent application Ser. No. 15/481,870, filed Apr. 7, 2017, the entirety of which is herein incorporated by reference, OBIGGS system testing has shown that a hollow fiber membrane of an air separation module (ASM), whose performance has been negatively impacted by contaminated inlet air, may be regenerated by operating the ASM at higher inlet temperatures and/or by increasing the flow rate of an airflow through the ASM. During normal OBIGGS operations, the ASM may be operated in one of multiple flow modes (e.g., low, medium, and high) with an inlet air temperature that ranges from about 160° F. to about 210° F. However, operating the OBIGGS with an ASM inlet air temperature of about 225° F. to about 300° F. at a high-flow mode for at least 15 minutes may substantially recover ASM performance following hollow fiber membrane contamination. In continuing the above example, an OBIGGS may, for instance, conduct an ASM regeneration cycle once every aircraft flight or as indicated by ASM PHM so as to remove contaminates that may have impacted the ASM hollow fiber membrane since the previous regeneration cycle. It should be noted that, while a regeneration cycle may be conducted at any time, regeneration during flight (i.e., when the aircraft is not on the ground) may be preferred due to the availability of cleaner inlet air at cruising altitudes.

Figure 1:
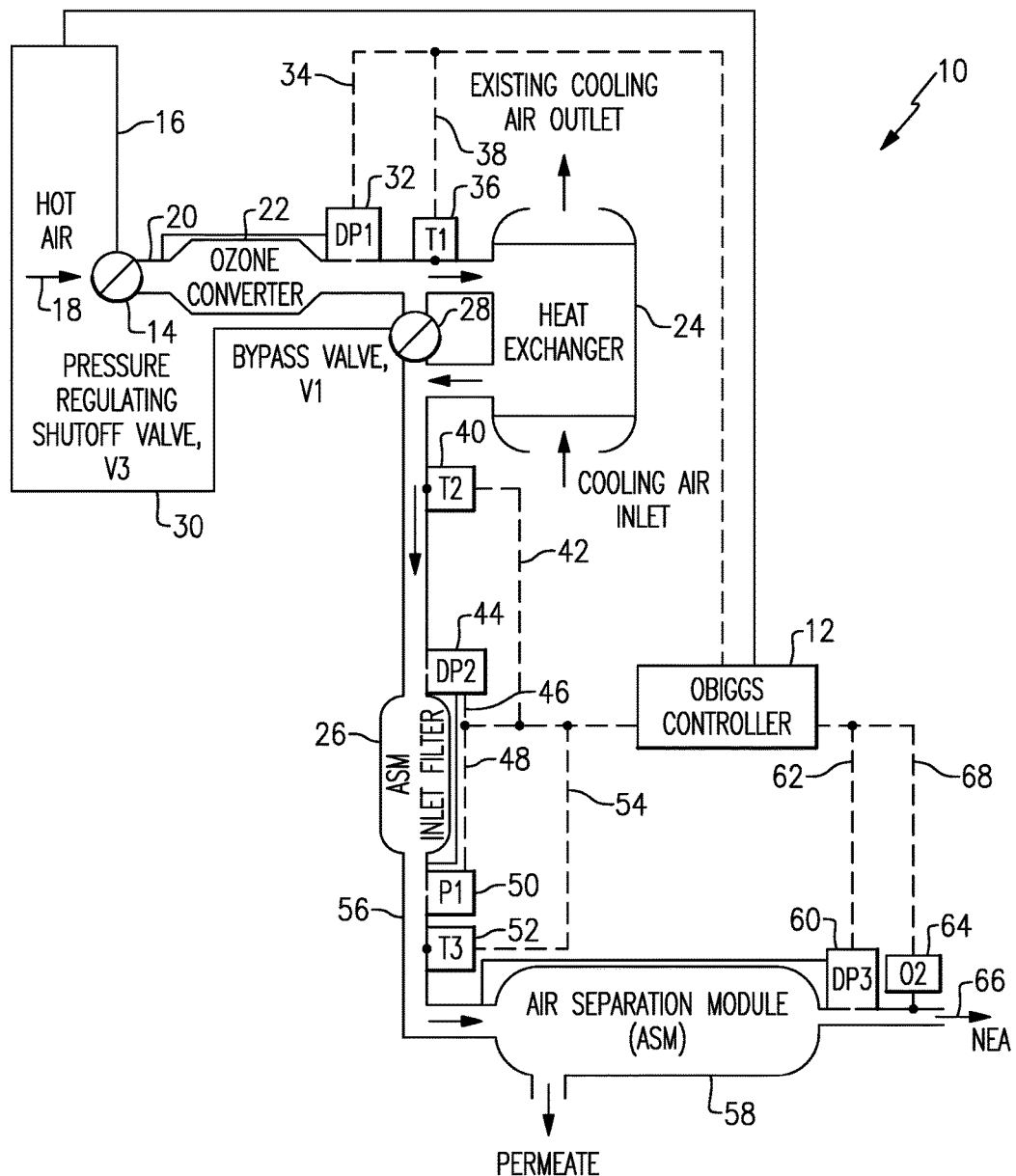
FIG. 1 is a schematic view of an embodiment of an OBIGGS suitable for prognostic health monitoring in accordance with and aspect of the present invention.

Referring now to FIG. 1, OBIGGS 10 for an aircraft (not shown) may be amenable to prognostic health monitoring (PHM) of OBIGGS components in accordance with an aspect of the present invention. It should be noted that OBIGGS 10 may be placed at different locations within the aircraft, such as the back wing, for example, and should be operatively coupled to one or more downstream fuel tanks (not shown) to ensure proper functionality. As can be seen in FIG. 1, OBIGGS 10 may include a control unit 12. In operation, a bleed air shutoff valve 14 may be in communication with unit controller 12 via communication pathway 16 and may be positioned to receive an inlet air 18, such as (contaminated) bleed air from the aircraft's engines, and direct such inlet air 18 through OBIGGS supply line 20. Inlet air (engine bleed air) 18 passing through shutoff valve 14 may pass through ozone converter 22 before being directed into heat exchanger 24 or to ASM inlet filter 26 upon operation of bypass valve 28 controlled by control unit 12 through control pathway 30. Ozone converter 22 may be a low- or high-temperature catalytic converter configured to remove ozone gas from inlet air 18 before it enters the downstream components. ASM inlet filter 26 may comprise a particulate filter, carbon bed filter, and/or coalescing filter, for example.

Delta pressure sensor 32 may be configured to monitor pressure drop of inlet air 18 across ozone converter 22 and communicate such pressure drop data to control unit 12 via communication pathway 34. Temperature sensor 36 may monitor the temperature of inlet air 18 prior to injection into heat exchanger 24, with such temperature data being communicated to control unit 12 via communication pathway 38. Temperature sensor 40 measures the temperature of the conditioned inlet air before it enters ASM inlet filter 26 and communicates such data to control unit 12 via communication pathway 42. Bypass valve 28 may then be regulated by control signals communicated from control unit 12 through control pathway 30 so as to selectively condition the inlet air before injection into ASM inlet filter 26. Delta pressure sensor 44 may be configured to measure the pressure drop of the airflow through ASM inlet filter 26 and communicate such pressure drop data to control unit 12 via communication pathway 46.

Downstream from ASM inlet filter 26 may be at least one pressure sensor 50 in communication with control unit 12 via communication pathway 48. At least one temperature sensor 52 may also be in communication with control unit 12, such as through communication pathway 54. Pressure sensor 50 (e.g., transducer) may function to sense, measure, communicate, and/or record the pressure of the airflow of clean air within the clean air supply line 56 while temperature sensor 52 (e.g., thermometer, thermistor, etc.) may function to sense, measure, communicate, and/or record the temperature of the clean air airflow. The clean air is delivered to ASM 58 via clean air supply line 56. ASM 58 may include a hollow-fiber membrane (not shown) configured to produce a volume of nitrogen gas for eventual delivery to the fuel tank ullage for inerting of the aircraft fuel tank as described above. Delta pressure sensor 60 may monitor the pressure drop of the airflow across ASM 58 and communicate such data to control unit 12 via communication pathway 62. $O_2$ sensor 64 may monitor the percent oxygen ($O_2$%) of the nitrogen enriched air (NEA) exhaust 66 and communicate such NEA purity data to control unit 12 via communication pathway 68.

Figure 2A:
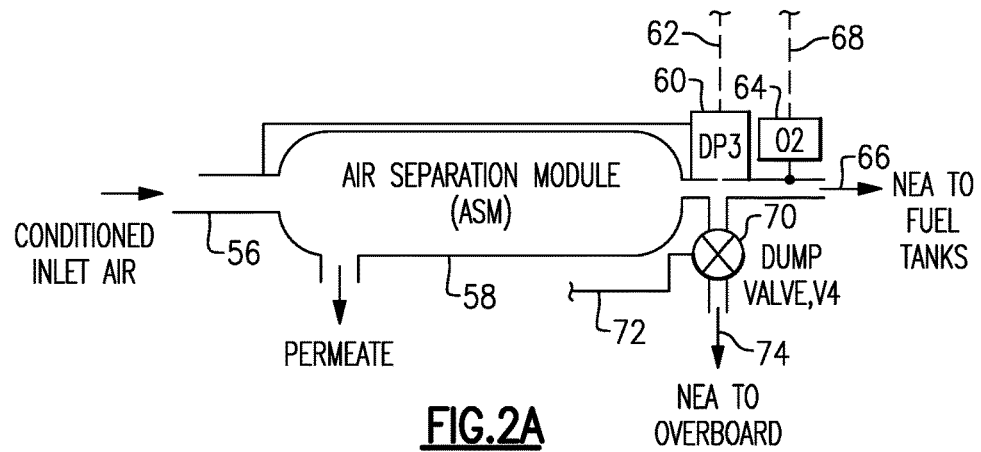
FIG. 2A is a schematic view of an alternative ASM configuration for use in the OBIGGS shown in FIG. 1.
Figure 2B:
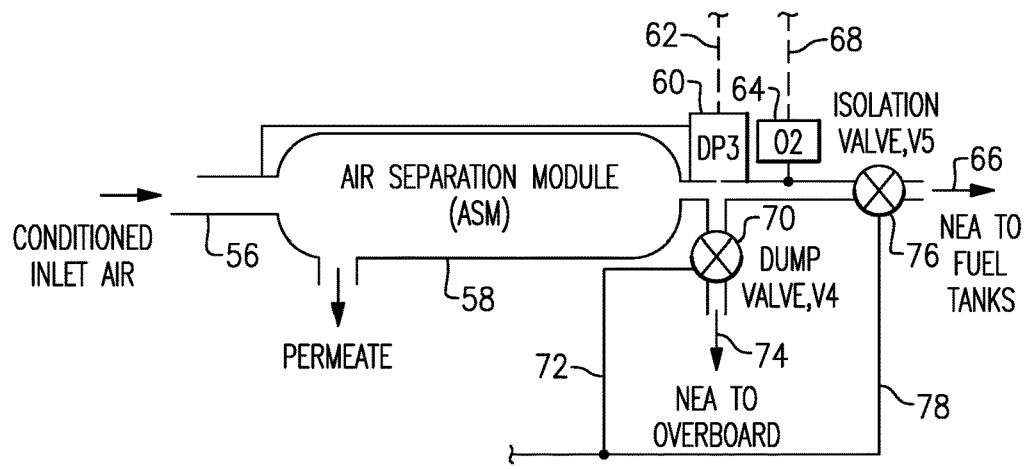
FIG. 2B is a schematic view of another alternative ASM configuration for use in the OBIGGS shown in FIG. 1.
Figure 2C:
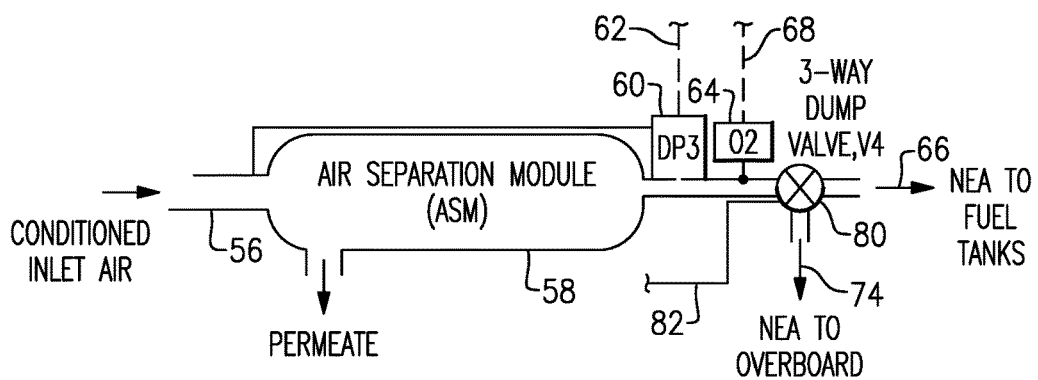
FIG. 2C is a schematic view of still another alternative ASM configuration for use in the OBIGGS shown in FIG. 1.

With reference to FIG. 2A, OBIGGS 10 may include a dump valve 70 under operational control of control unit 12 via control pathway 72 whereby unwanted product gas 74 may be dumped overboard from the aircraft prior to entering the one or more downstream fuel tanks. In such an instance, dump valve 70 would be opened during the regeneration cycle to send at least a portion of product gas 74 overboard the aircraft with any remaining portion of product gas 66 flowing to the one or more downstream fuel tanks at a reduced flow rate and cooler temperature. Additionally, and with reference to FIG. 2B, an optional isolation valve 76 may be further included within OBIGGS 10. Isolation valve 76 may be under operational control of control unit 12 via control pathway 78 and may be selectively closed such that any remaining portion of product gas 66 will not enter the one or more downstream fuel tanks but will be dumped overboard through dump valve 70. With reference to FIG. 2C, the dump valve may be embodied as a three-way valve 80 under operational control of control unit 12 via control pathway 82. Three-way valve 80 may be selectively positioned such that a portion (or all) of product gas 74 may be controllably dumped overboard with the remaining portion of product gas 66 (if any) entering the one or more downstream fuel tanks.

Figure 3:
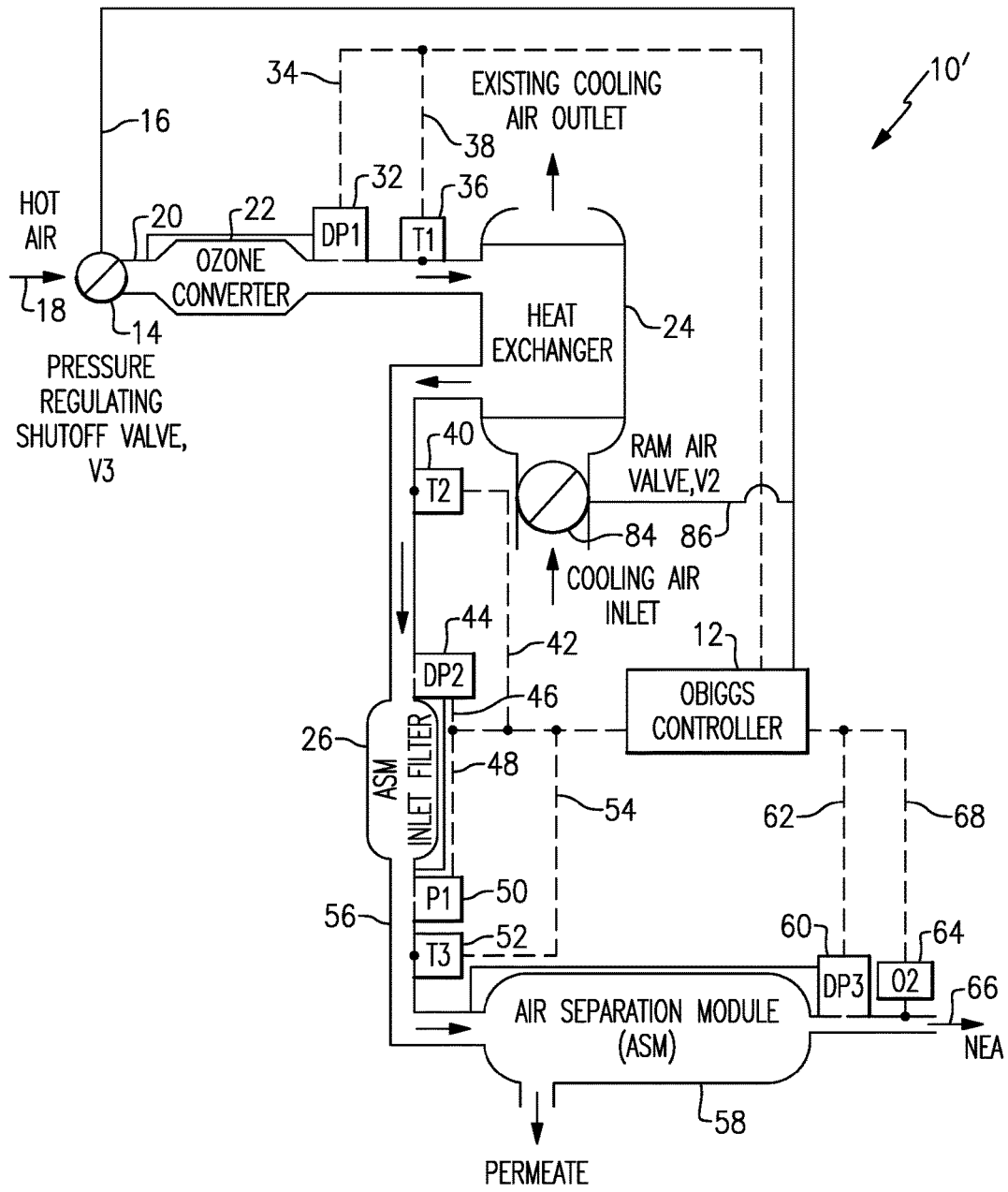
FIG. 3 is a schematic view of another embodiment of an OBIGGS suitable for prognostic health monitoring in accordance with and aspect of the present invention.

With reference to FIG. 3, in a further aspect of the present invention, OBIGGS 10' may be otherwise similar to OBIGGS 10 describe above, with the exception of the removal of bypass valve 28 and inclusion of ram air valve 84 in fluid communication with heat exchanger 24 and under operational control of control unit 12 via control pathway 86. In this manner, all of inlet air 18 may be directed into heat exchanger 24 for temperature conditioning prior to introduction into ASM filter 26. As a result, control unit 12 may selectively control the inlet temperature of air entering ASM 58 by modulating either bypass valve 28 of OBIGGS 10 (FIG. 2) or ram air valve 84 of OBIGGS 10' (FIG. 3).

During system operations of either OBIGGS 10 or OBIGGS 10', as indicated by dashed lines, control unit 12 may receive, monitor, and analyze any communicated data from the system components, such as temperature sensors 36, 40 and 52, delta pressure sensors 32, 44 and 60, pressure sensor 50 and $O_2$ sensor 64. In accordance with an aspect of the present invention, these sensors 32, 36, 40, 44, 50, 52, 60, 64 may form a collective network of PHM sensors, each in communication with OBIGGS control unit 12 and may operate alone or in collaboration to monitor and communicate various component characteristics as described above. Control unit 12 may coordinate with each respective PHM sensor within the network to receive and record measurement data for analytical interrogation before, during or after flight.

In one aspect of the present invention, control unit 12 may be configured to indicate how long each of the OBIGGS components (e.g., ozone converter 22, heat exchanger 24, ASM inlet filter 26 and ASM 58) has been operating, as well as when a respective component has been replaced or reset. In a further aspect of the present invention, control unit 12 may also be configured to incorporate one or more algorithmic instructions to analyze and review sensor data from the PHM sensor network. By way of example and by no means limiting solely thereto, control unit 12 may include algorithmic instructions to monitor for substantial deviations in measured values which may indicate that a component has been replaced within system 10, 10' or has suffered a catastrophic failure. Additionally, for certain system 10, 10' applications, the inlet pressure of inlet air 18 may need to be regulated so as to prevent damage of downstream system components, such as via selective control of pressure regulating valve 14. To that end, a baseline pressure setting may be programmed into one or more of the algorithmic instructions incorporated into control unit 12. This baseline pressure may be set at the factory and may be unit or application specific. Further, the baseline pressure may be one pressure setting, or may be multiple pressure settings that may vary as a function of flight phase (such as, but not limited to, a first pressure setting based upon aircraft cruise characteristics and a second pressure setting based on aircraft descent characteristics).

In a further aspect of the present invention, an example of PHM sensor network monitoring and control unit 12 control of an aircraft OBBIGS 10, 10' may be seen through the following discussion regarding the monitoring and regeneration of ASM 58. In this example, whether using either OBIGGS 10 or OBIGGS 10', a baseline temperature setting (representing typical ASM performance) may be programmed into one or more algorithmic instructions incorporated into control unit 12 to properly control the inlet temperature of the clean air entering ASM 58 via clean air supply line 56. It should be appreciated by those skilled in the art that this may be one temperature setting, or multiple temperature settings that may vary as a function of flight phase (for instance and without limitation solely thereto, a first temperature setting based upon aircraft cruise characteristics and a second temperature setting based on aircraft descent characteristics). The baseline temperature setting may enable efficient ASM 58 air separation and production of NEA exhaust air 66. However, over time and as indicated by PHM sensor network data (e.g., temperature data from sensor 52 and pressure drop data from sensor 60 and NEA exhaust gas purity data from $O_2$ sensor 64), ASM 58 may become contaminated. Air separation efficiency of ASM 58 may be improved through control unit 12 directed adjustments to pressure regulating valve 14 and/or either bypass valve 28 (FIG. 2) or ram air valve 84 (FIG. 3). In this manner, control unit 12 may modify either or both pressure and temperature of the inlet air and filtered clean air, independently or simultaneously, to improve ASM performance and ASM operational lifetime.

Figure 4:
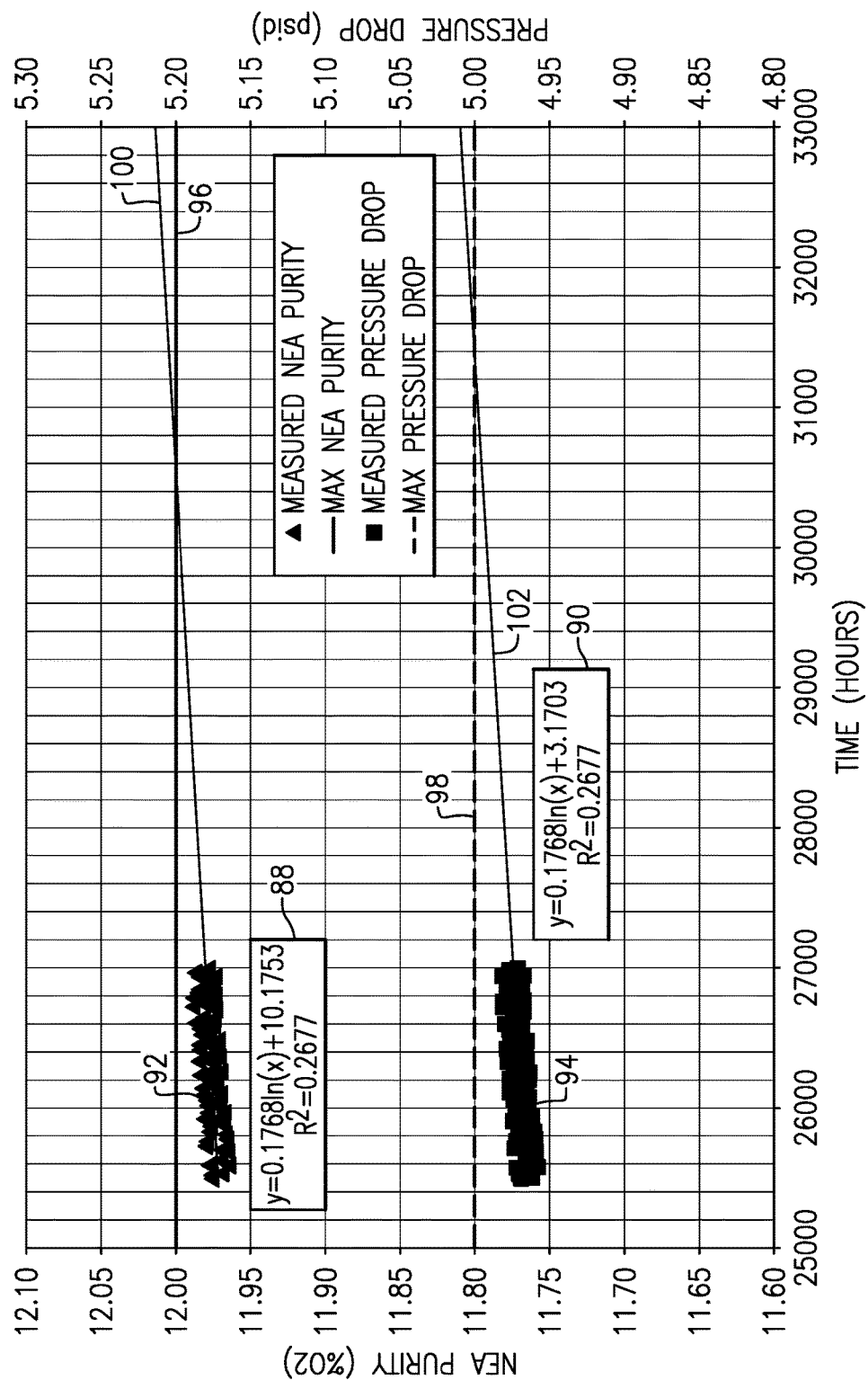
FIG. 4 is a theoretical plot of NEA purity versus time of measured ASM test data results.

To enable proper control unit adjustments, the performance degradation of ASM 58 may be characterized with an empirical equation, such as a ASM performance equations 88, 90 derived through factory testing and/or computer modeling. Referring to FIG. 4, ASM 58 performance may be evaluated through interrogating NEA purity data 92 received from $O_2$ sensor 64 and pressure drop data 94 received from delta pressure sensor 60. Threshold pass/fail values for NEA purity 96 and delta pressure 98 may be predetermined and may be system and use specific. OBIGGS control unit 12 may record and store data 92 and 94 and generate empirical curve fit 100, 102 for NEA purity and delta pressure, respectively, as dictated by ASM performance equations 88, 90. Extrapolating empirical curve fits 100, 102 may allow for an estimation of the remaining operating hours of ASM 58 before performance will exceed the threshold pass/fail values for NEA purity 96 and delta pressure 98.

After determining ASM performance equations 88, 90 and their respective ASM performance curves 100, 102, control unit 12 may be programmed with an algorithm configured to permit built-in testing (BIT/BIT test) of ASM 58. By way of example, control unit 12 may query ASM inlet temperature sensor 52, inlet pressure sensor 50, and receive aircraft altitude data (e.g., via an aircraft signal provided to control unit 12, such as from the on-board altimeter) at least once each flight during a specific flight phase. Preferably, BIT queries occur after the input conditions are determined to be sufficiently stable, such as may be determined by time-weighted averages of sensor data (i.e., data received from sensors 50, 52) until a selected standard deviation of the sensor data is achieved or maintained for a predetermined period of time. ASM product gas 66 may be analyzed to interrogate NEA purity, such as through data received from $O_2$ sensor 64, as well as ASM pressure drop data received from delta pressure sensor 60, as a function of time. This collective data may then be analyzed by control unit 12, with appropriate control signals 16 and/or 30 sent to valves 14, 28, respectively, as indicated by the stored algorithm. In this manner, and as shown in FIG. 4, air separation efficiencies of ASM 58 may be maintained below the threshold pass/fail values 96, 98 for a period of time, even as ASM 58 becomes contaminated.

Figure 5:
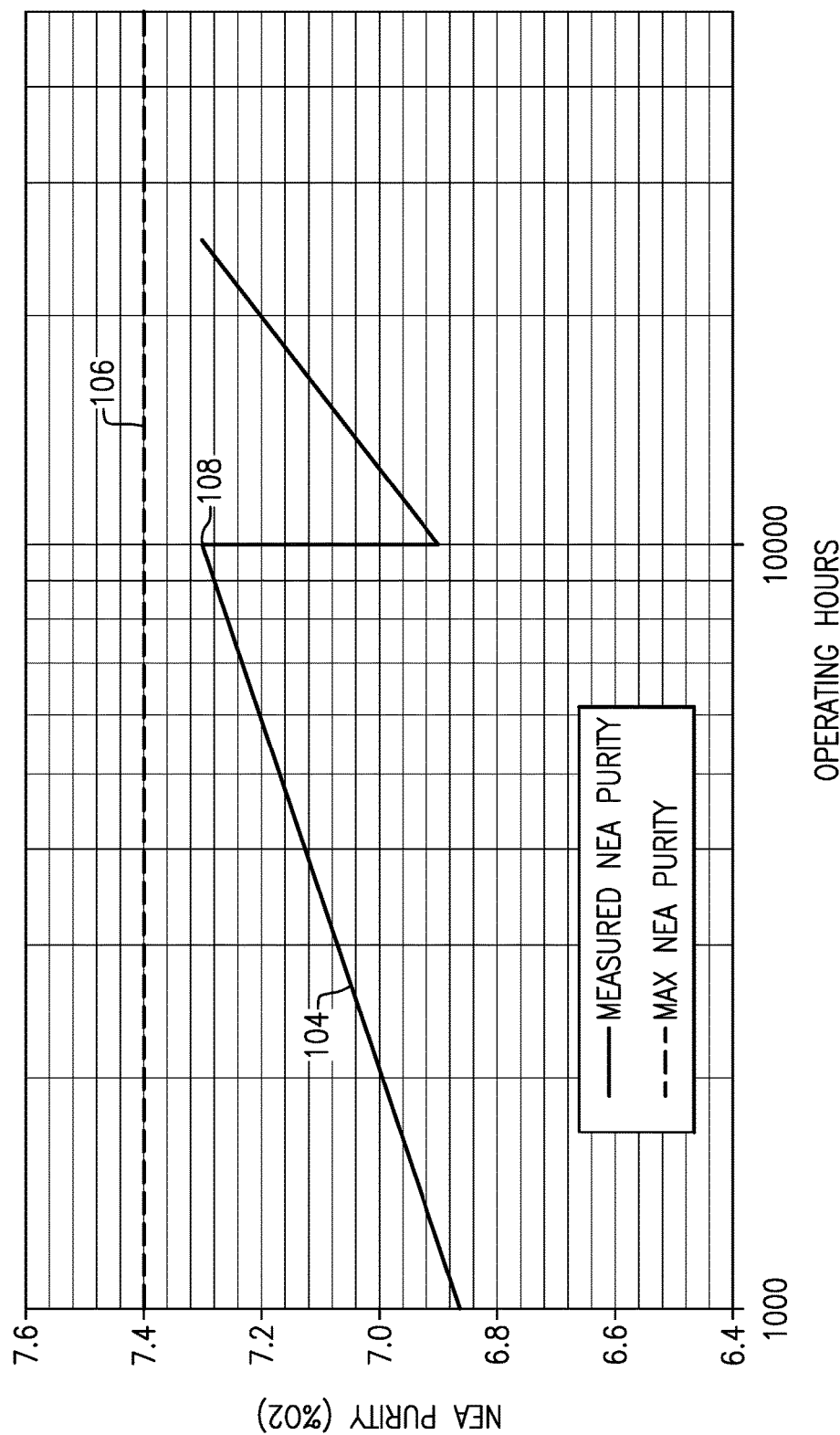
FIG. 5 is a theoretical plot of NEA purity versus operating hours demonstrating ASM regeneration in accordance with an aspect of the present invention.

As shown in FIG. 5, when NEA purity 104 of product gas 66 output by ASM 58 climbs towards maximum NEA purity limit 106 as monitored by $O_2$ sensor 64, the algorithm stored within control unit 12 may initiate an ASM improvement protocol. In the example shown in FIG. 5, at approximately 10,000 operating hours and as indicated by reference numeral 108, NEA purity may be improved by increasing ASM inlet air pressure (such as by about 1 psi) and/or increasing ASM inlet air temperature (such as by about 10° F.) at which point ASM 58 may output product gas 66 comparable to its initial uncontaminated condition. In this manner, ASM 58 operational life can be extended. However, returning ASM inlet pressure and air temperature to their initial settings will cause ASM 58 to return to the degraded state. To that end, the algorithm may further initiate an ASM regeneration protocol as described above. By way of example, ASM inlet pressure may be increased (such as by about 5 psig) and/or ASM inlet air temperature may be increased (such as to between about 225° F. and about 250° F.) and/or the airflow may be switched to operate in the high-flow mode for a specified period of time (such as at least 15 minutes) at which point ASM 58 may regenerate. However, it should be understood that a maximum allowable inlet air temperature (e.g., about 300° F.) or inlet air pressure (e.g., about 55 psig) may be programmed into control unit 12 so as to prevent damage to other OBIGGS components or the aircraft. In the event that ASM 58 may not be regenerated so as to output NEA below a certain threshold (e.g., below 10% of threshold pass/fail limit 106), ASM 58 may be removed from system 10, 10' for replacement with a new or refurbished ASM unit.

Figure 6:
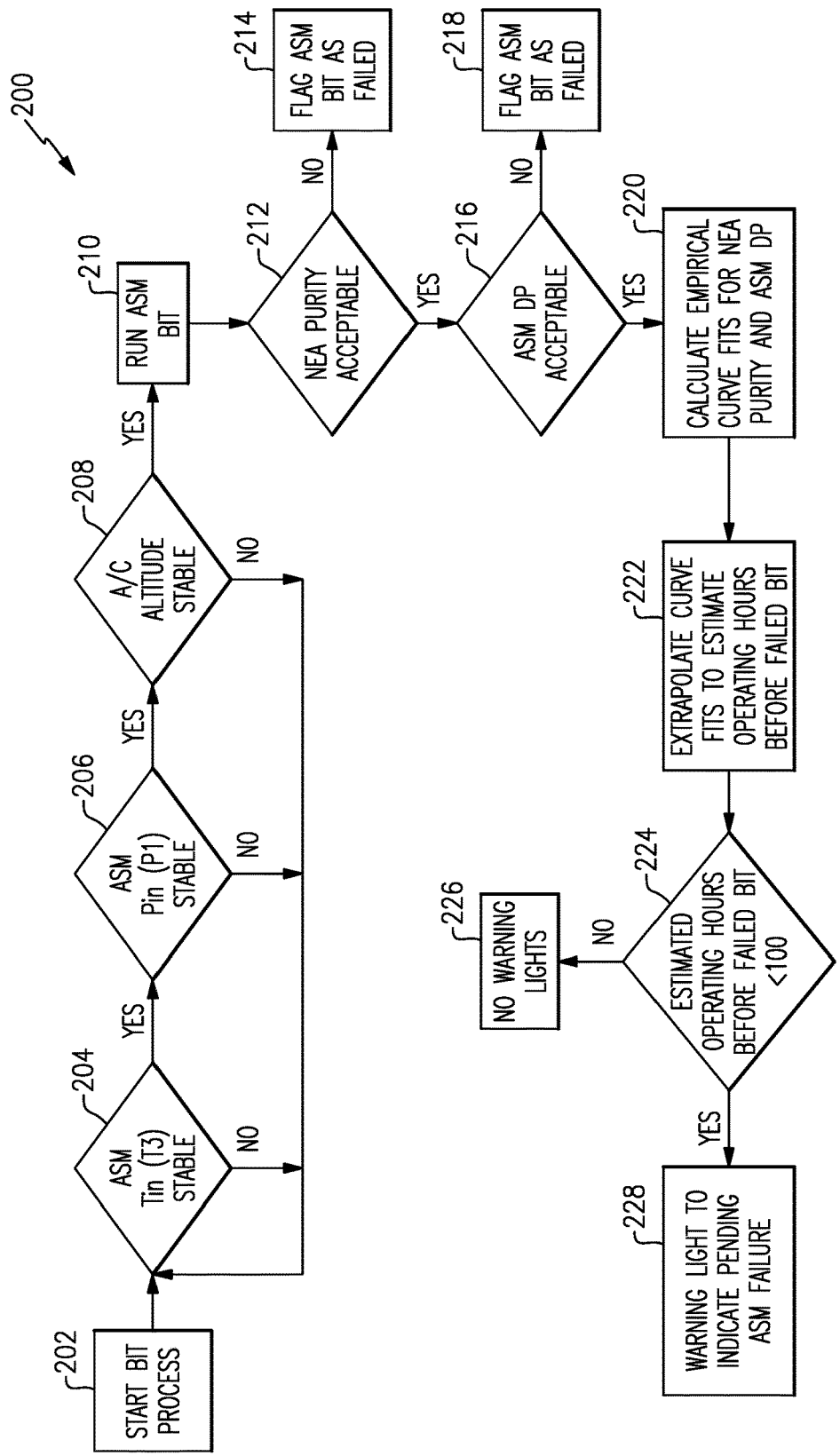
FIG. 6 is a flow diagram of an embodiment of an algorithmic method for an ASM test protocol.

In view of the above discussion, an exemplary flow chart of an algorithm 200 that may be incorporated into control unit 12 to conduct ASM BIT testing is shown in FIG. 6. As shown, at step 202, control unit 12 may initiate the test condition of ASM 58. At step 204, control unit 12 may interrogate data received from ASM inlet temperature sensor 52 (FIGS. 1 and 3) to determine if the inlet air temperature is sufficiently stable. If the inlet air temperature is determined to be unstable, control unit 12 may return to the beginning of step 204. If inlet air temperature is determined to be sufficiently stable, control unit 12 will move to step 206. At step 206, control unit 12 may interrogate data received from inlet pressure sensor 50 to determine if the inlet air pressure is sufficiently stable as described above. If the inlet air pressure is determined to be unstable, control unit 12 may return to the beginning of step 204. If the inlet air pressure is determined to be stable, control unit 12 will move to step 208. At step 208, control unit 12 may interrogate data received from the aircraft's on-board altimeter to determine if aircraft altitude is sufficiently stable. If the aircraft altitude is determined to be unstable, control unit 12 may return to the beginning of step 204. If aircraft altitude is determined to be sufficiently stable, control unit 12 will move to step 210 and initiate BIT testing of ASM 58.

At step 212, control unit 12 may interrogate data received from $O_2$ sensor 40 to determine if the NEA purity of NEA exhaust 66 is within acceptable limits. If NEA purity is determined to be unacceptable, control unit 12 will flag the ASM BIT as a failure at step 214, thereby signaling ASM 58 failure or triggering an ASM regeneration protocol as described above. However, if NEA purity is found to be acceptable, control unit 12 will move to step 216 and interrogate data received from delta pressure sensor 60 to determine if pressure drop across ASM 58 is acceptable. If the measured pressure drop is unacceptable, control unit 12 will flag the ASM BIT as a failure at step 218, again signaling ASM 58 failure or triggering an ASM regeneration protocol. However, if the measured pressure drop is found to be acceptable, control unit 12 will move to step 220 and calculate an empirical curve fits 102, 104 for both NEA purity and ASM delta pressure, respectively (see FIG. 4). At step 222, control unit 12 will the extrapolate curves 102, 104 to estimate the number of operating hours of ASM 58 before BIT failure (i.e., the length of time from the last measurement until either curve 102, 104 intersects its respective maximum limit threshold 96, 98). At step 224, control unit 12 may determine if the estimated length of time is less than a predetermined period of time, for instance 100 hours. As an example, if either curve 102 or 104 indicates that there are more than 100 hours remaining before an ASM BIT failure is estimated to occur, control unit 12 will not communicate an alert, such as activating one or more warning lights (step 226). However, if one of curves 102, 104 indicates that there are less than 100 hours remaining before an ASM BIT failure is estimated to occur, control unit 12 will communicate a warning, such as activating one or more warning lights, to indicate a pending ASM failure (step 228). Control unit 12 may automatically initiate an ASM regeneration protocol, or an operator may manually initiate an ASM regeneration protocol upon issuance of the alert so as to extend ASM 58 operating lifetime as described above. If ASM regeneration is not possible, ASM 58 may be replaced with a new ASM unit.

In a further aspect of the present invention, the PHM sensor network may monitor the health and operational characteristics of additional OBIGGS components. By way of example, delta pressure sensor 44 and pressure sensor 50 may monitor operation of ASM inlet filter 26 (FIGS. 1 and 3). Similar to ASM performance monitoring described above, the performance degradation of ASM inlet filter 26 may be characterized with an empirical equation, such as an ASM inlet filter performance equation 110 (FIG. 7) derived through factory testing and/or computer modeling. By way of example, performance testing of ASM inlet filter 26 may be conducted through the injection of particulates (i.e., dirt) whereby delta pressure sensor 44 data and pressure sensor 50 data may show an increase in pressure drop across ASM inlet filter 26 as the particulate accumulates internally. As such, the rate of particulate loading can be converted into an estimate of remaining operating hours of ASM inlet filter 26. Such an estimate may also compensate for additional aircraft flight profile information and an estimated particulate loading rate expectation. The pressure drop across ASM inlet filter 26 may be monitored continuously during flight operations, with an inlet filter pressure drop test occurring at least once a flight during a specific flight phase occurring after the input conditions are determined to be sufficiently stable as described above.

Figure 7:
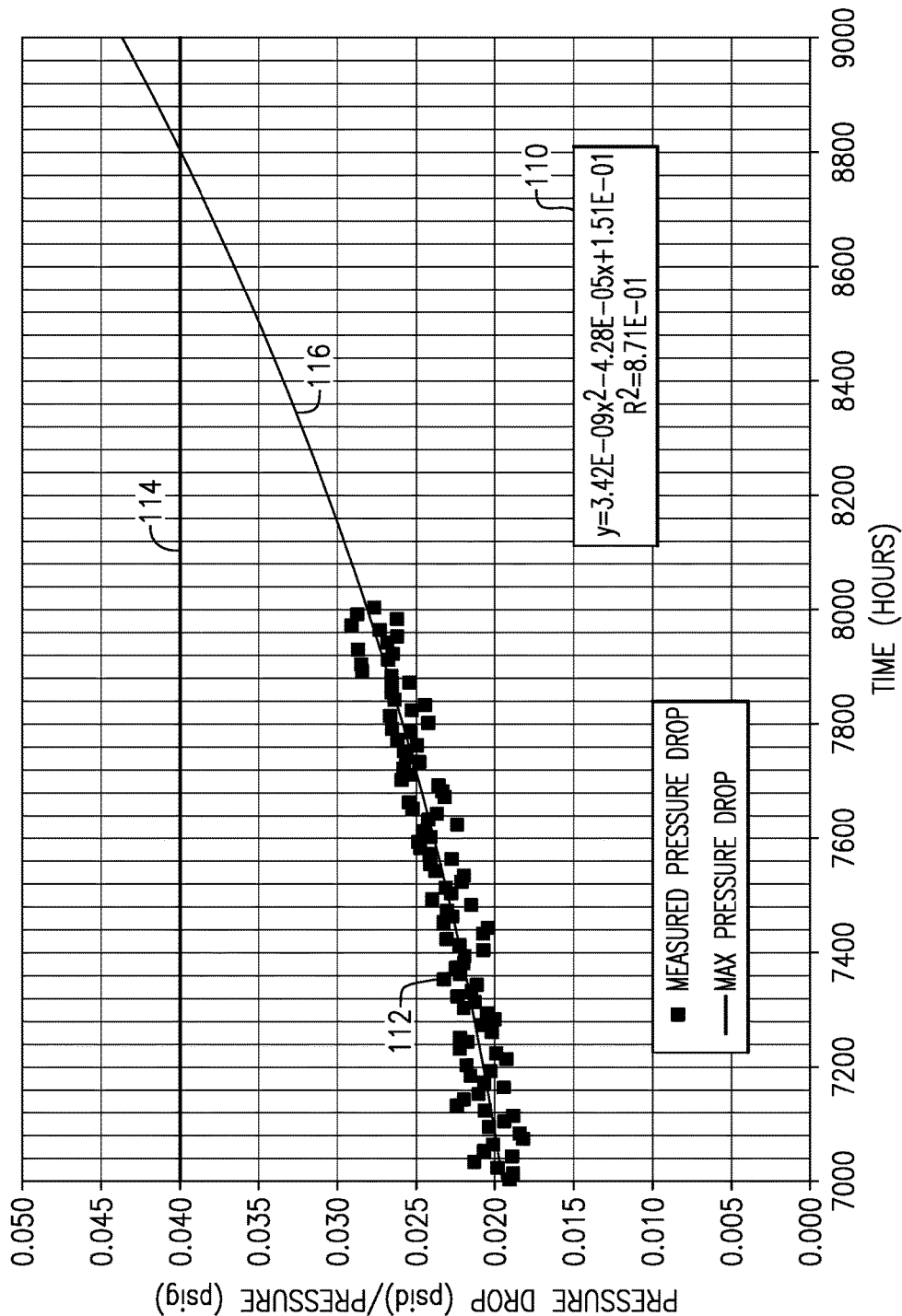
FIG. 7 is a theoretical plot of pressure drop/pressure versus time of measured ASM inlet filter test data results.

Thus, as shown in FIG. 7, ASM inlet filter 26 performance may be evaluated through interrogating pressure drop data 112 received from delta pressure sensor 44 and pressure sensor 50. A threshold pass/fail value for a maximum allowable pressure drop 114 may be predetermined and may be system and use specific. OBIGGS control unit 12 may record and store pressure drop data 112 and generate empirical curve fit 116 as dictated by ASM inlet filter performance equation 110. Extrapolating empirical curve fit 116 may allow for an estimation of the remaining operating hours of ASM inlet filter 26 before performance will exceed the threshold pass/fail value 114, at which point ASM inlet filter 26 may be repaired or replaced. It should be noted that the variation in measured results is shown to account for the fact that flows through the filter will vary a small amount from one flight test case to the next.

Figure 8:
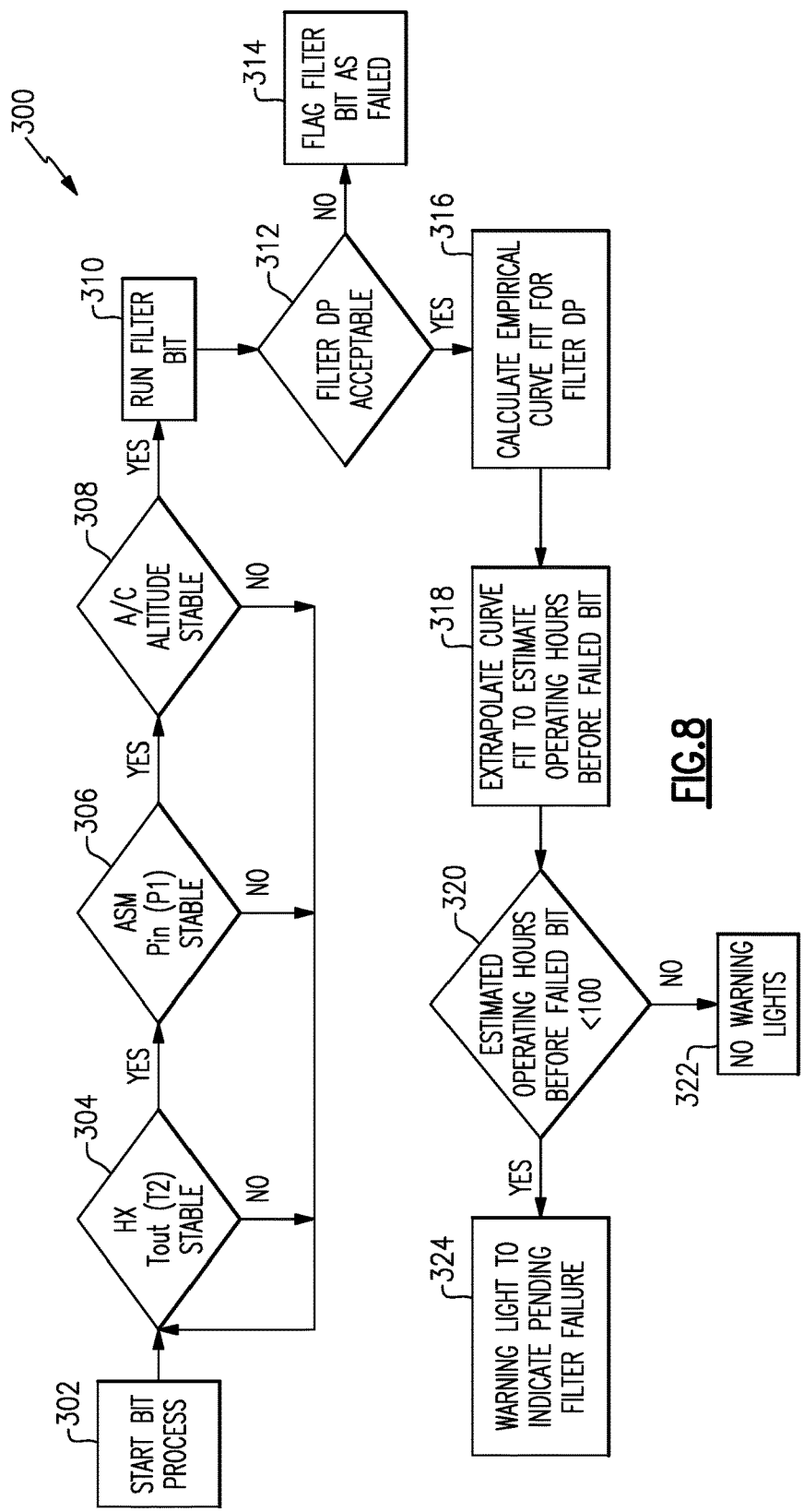
FIG. 8 is a flow diagram of an embodiment of an algorithmic method for an ASM inlet filter test protocol.

Turning now to FIG. 8, an exemplary flow chart of an algorithm 300 that may be incorporated into control unit 12 to conduct ASM inlet filter BIT testing is shown. As shown, at step 302, control unit 12 may initiate the test condition of ASM inlet filter 26. At step 304, control unit 12 may interrogate data received from heat exchanger outlet temperature sensor 40 (FIGS. 1 and 3) to determine if the inlet air temperature is sufficiently stable. If the inlet air temperature is determined to be unstable, control unit 12 may return to the beginning of step 304. If inlet air temperature is determined to be sufficiently stable, control unit 12 will move to step 306. At step 306, control unit 12 may interrogate data received from inlet pressure sensor 50 to determine if the inlet air pressure is sufficiently stable as described above. If the inlet air pressure is determined to be unstable, control unit 12 may return to the beginning of step 304. If the inlet air pressure is determined to be stable, control unit 12 will move to step 308. At step 308, control unit 12 may interrogate data received from the aircraft's on-board altimeter to determine if aircraft altitude is sufficiently stable. If the aircraft altitude is determined to be unstable, control unit 12 may return to the beginning of step 304. If aircraft altitude is determined to be sufficiently stable, control unit 12 will move to step 310 and initiate BIT testing of ASM inlet filter 26.

At step 312, control unit 12 may interrogate data received from delta pressure sensor 44 to determine if the pressure drop at the output of the ASM inlet filter 26 is within acceptable limits (such as below threshold pass/fail value 114). If the magnitude of the pressure drop is determined to be unacceptable, control unit 12 may flag the ASM inlet filter BIT as a failure at step 314, thereby signaling ASM inlet filter 26 failure and indicated need for filter repair or replacement. However, if the pressure drop across ASM inlet filter 26 is determined to be acceptable, control unit 12 will move to step 316 and calculate empirical curve fit 116 (FIG. 7) for pressure drop across ASM inlet filter 26 as a function of time. At step 318, control unit 12 will extrapolate curve fit 116 to estimate the number of operating hours of ASM inlet filter 26 before BIT failure (i.e., the length of time from the last measurement until curve fit 116 intersects maximum limit threshold 114). At step 320, control unit 12 may determine if the estimated length of time is less than a predetermined period of time, for instance 100 hours. As an example, if curve fit 116 indicates that there are more than 100 hours remaining before an ASM inlet filter BIT failure is estimated to occur, control unit 12 will not communicate an alert, such as activating one or more warning lights (step 322). However, if curve fit 116 indicates that there are less than 100 hours remaining before an ASM inlet filter BIT failure is estimated to occur, control unit 12 will communicate a warning, such as activating one or more warning lights, to indicate a pending ASM inlet filter 26 failure (step 324). An operator may then repair or replace ASM inlet filter 26 as appropriate.

Figure 9:
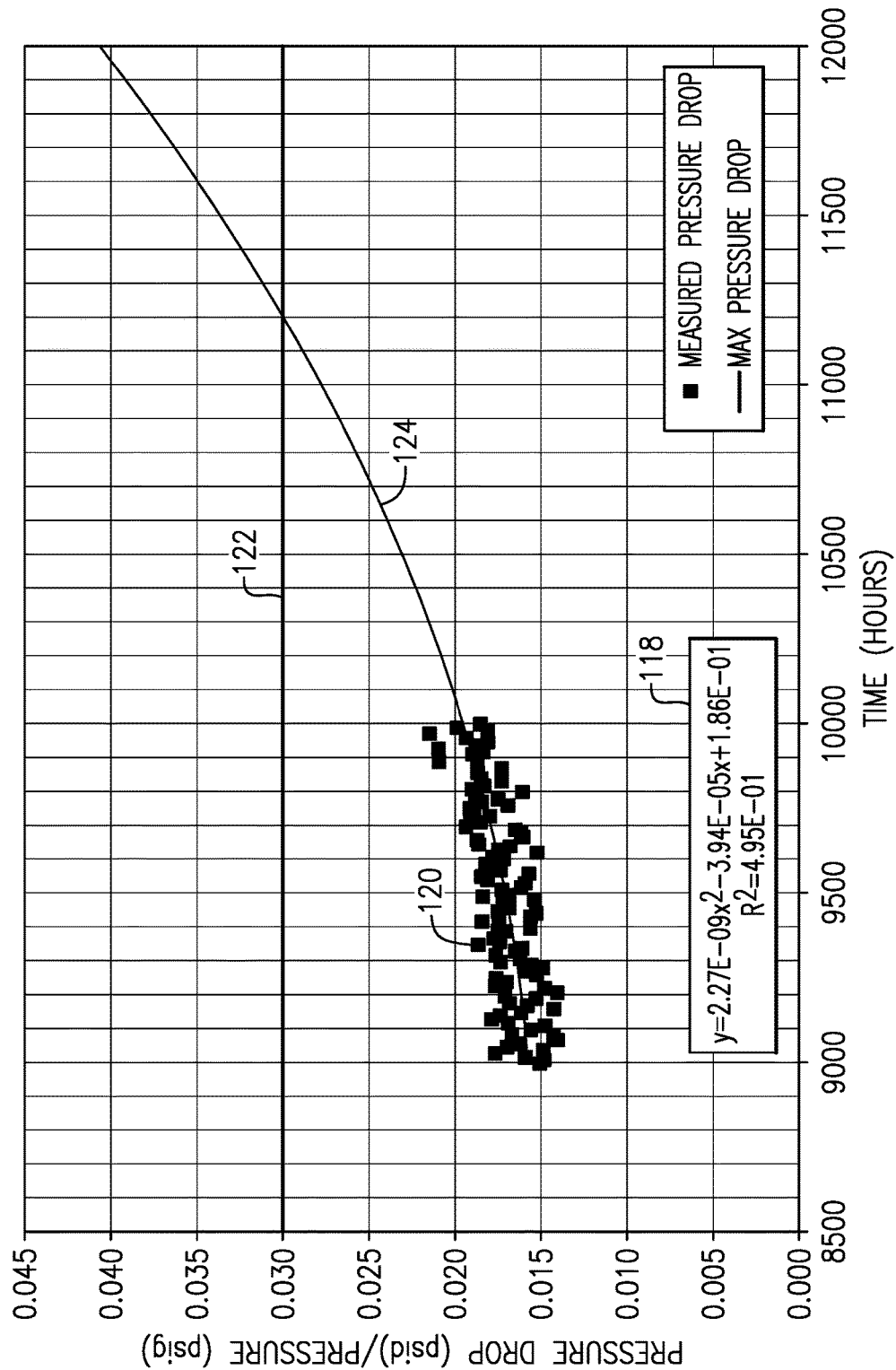
FIG. 9 is a theoretical plot of pressure drop/pressure versus time of measured ozone converter test data results.

In a further aspect of the present invention, and by way of further example, the PHM sensor network may monitor the health and operational characteristics of ozone converter 22, such as via delta pressure sensor 32 (FIGS. 1 and 3). Similar to ASM 58 and ASM inlet filter 26 performance monitoring described above, the performance degradation of ozone converter 22 may be characterized with an empirical equation, such as an ozone converter performance equation 118 derived through factory testing and/or computer modeling (FIG. 9). By way of example, performance testing of ozone converter 22 may be conducted through the injection of contaminants whereby delta pressure sensor 32 data may show an increase in pressure drop indicating a drop in ozone removal efficiency. As such, the rate of contamination injection can be converted into an estimate of remaining operating hours of ozone converter 22. Such an estimate may also compensate for additional aircraft flight profile information and an estimated contamination loading rate expectation. The pressure drop across ozone converter 22 may be monitored continuously during flight operations, with an ozone converter test occurring at least once a flight during a specific flight phase occurring after the input conditions are determined to be sufficiently stable as described above.

Thus, as shown in FIG. 9, ozone converter 22 performance may be evaluated through interrogating pressure drop data 120 received from delta pressure sensor 32. A threshold pass/fail value for a maximum allowable pressure drop 122 may be predetermined and may be system and use specific. OBIGGS control unit 12 may record and store pressure drop data 120 and generate empirical curve fit 124 as dictated by ozone converter performance equation 118. Extrapolating empirical curve fit 124 may allow for an estimation of the remaining operating hours of ozone converter 22 before performance will exceed the threshold pass/fail value 122, at which point ozone converter 22 may be repaired or replaced.

Figure 10:
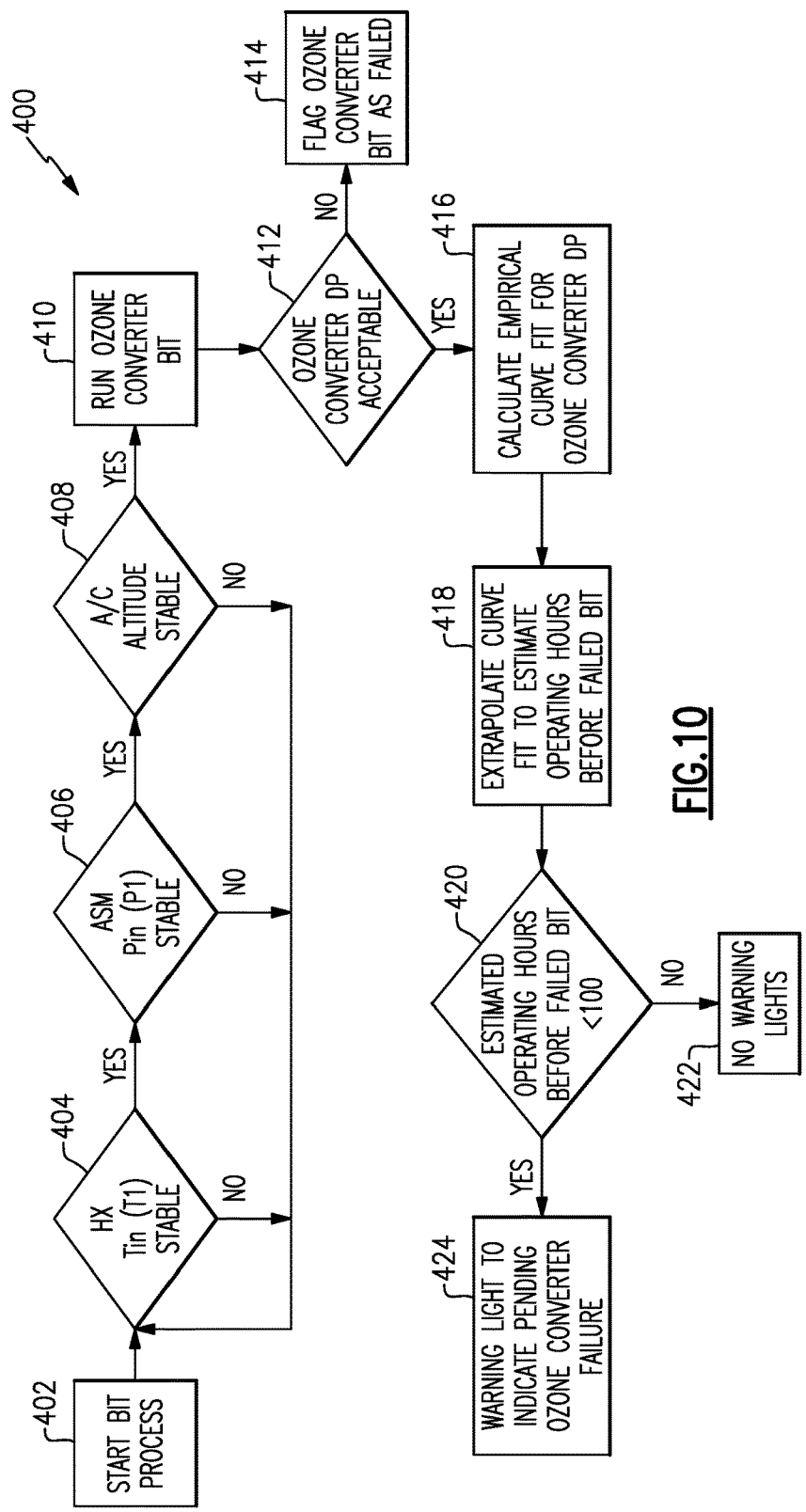
FIG. 10 is a flow diagram of an embodiment of an algorithmic method for an ozone converter test protocol.

Turning now to FIG. 10, an exemplary flow chart of an algorithm 400 that may be incorporated into control unit 12 to conduct ozone converter BIT testing is shown. As shown, at step 402, control unit 12 may initiate the test condition of ozone converter 22. At step 404, control unit 12 may interrogate data received from inlet temperature sensor 36 (FIGS. 1 and 3) to determine if the inlet air temperature is sufficiently stable. If the inlet air temperature is determined to be unstable, control unit 12 may return to the beginning of step 404. If inlet air temperature is determined to be sufficiently stable, control unit 12 will move to step 406. At step 406, control unit 12 may interrogate data received from inlet pressure sensor 50 to determine if the inlet air pressure is sufficiently stable as described above. If the inlet air pressure is determined to be unstable, control unit 12 may return to the beginning of step 404. If the inlet air pressure is determined to be stable, control unit 12 will move to step 408. At step 408, control unit 12 may interrogate data received from the aircraft's on-board altimeter to determine if aircraft altitude is sufficiently stable. If the aircraft altitude is determined to be unstable, control unit 12 may return to the beginning of step 404. If aircraft altitude is determined to be sufficiently stable, control unit 12 will move to step 410 and initiate BIT testing of ozone converter 22.

At step 412, control unit 12 may interrogate data received from delta pressure sensor 32 to determine if the pressure drop at the output of ozone converter 22 is within acceptable limits (such as below threshold pass/fail value 122). If the magnitude of the pressure drop is determined to be unacceptable, control unit 12 may flag the ozone converter BIT as a failure at step 414, thereby signaling ozone converter 22 failure and indicated need for repair or replacement. However, if the pressure drop across ozone converter 22 is determined to be acceptable, control unit 12 will move to step 416 and calculate empirical curve fit 124 (FIG. 7) for pressure drop across ozone converter 22 as a function of time. At step 418, control unit 12 will extrapolate curve fit 124 to estimate the number of operating hours of ozone converter 22 before BIT failure (i.e., the length of time from the last measurement until curve fit 124 intersects maximum limit threshold 122). At step 420, control unit 12 may determine if this estimated length of time is less than a predetermined period of time, for instance 100 hours. As an example, if curve fit 124 indicates that there are more than 100 hours remaining before an ozone converter BIT failure is estimated to occur, control unit 12 will not communicate an alert, such as activating one or more warning lights (step 422). However, if curve fit 124 indicates that there are less than 100 hours remaining before an ozone converter BIT failure is estimated to occur, control unit 12 will communicate a warning, such as activating one or more warning lights, to indicate a pending ozone converter failure (step 424). An operator may then repair or replace ozone converter 22 as appropriate.

Figure 11:
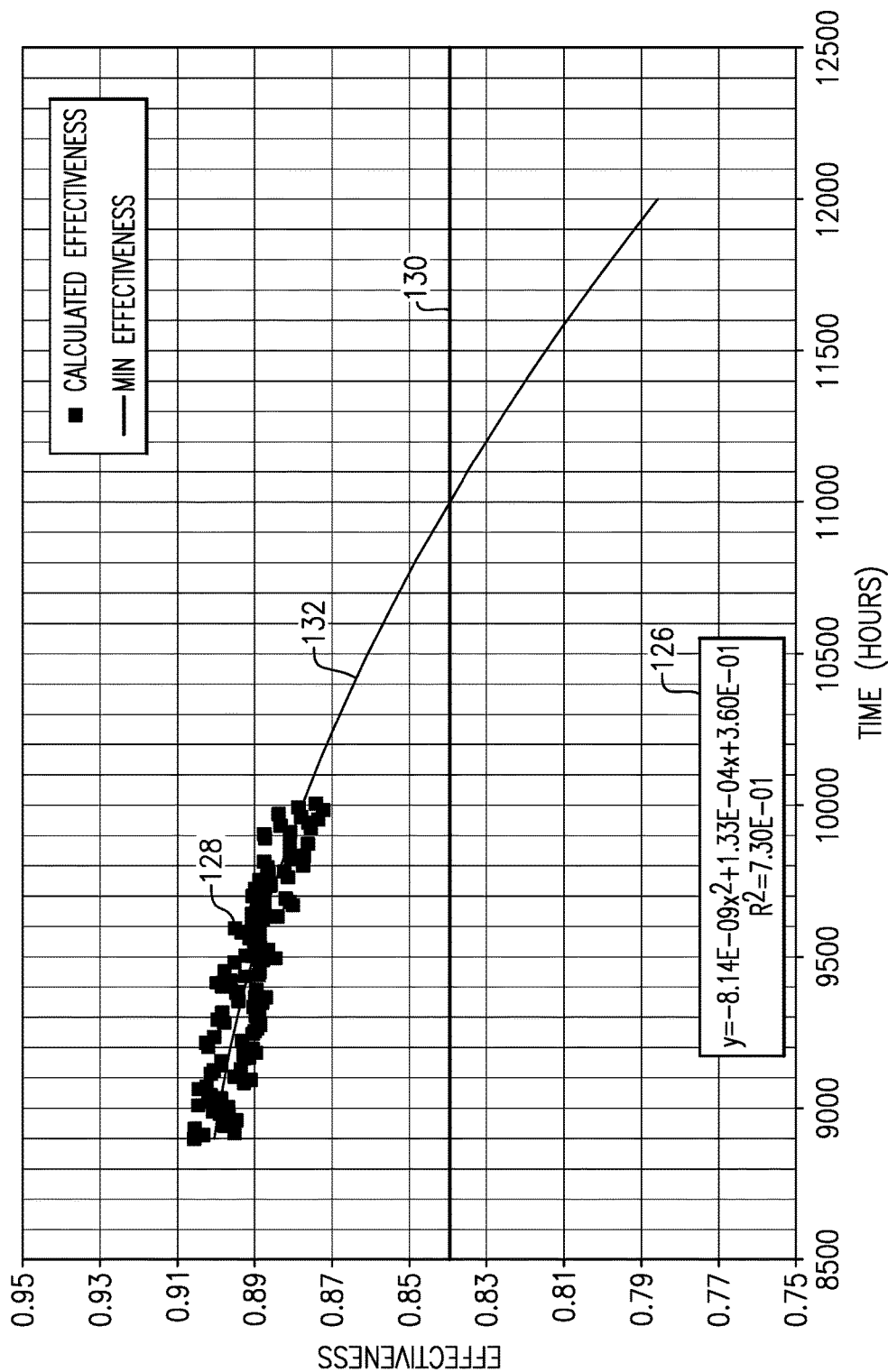
FIG. 11 is a theoretical plot of effectiveness versus time of measured heat exchanger test data results.

In yet another aspect of the present invention, and by way of example, the PHM sensor network may monitor the health and operational characteristics of heat exchanger 24, such as via temperature sensors 36, 40 (FIGS. 1 and 3), as well as ambient air temperature data provided to control unit 12 by an aircraft's on-board sensor. Similar to previous performance monitoring schemes described above, the performance degradation of heat exchanger 24 may be characterized with an empirical equation, such as a heat exchanger performance equation 126 derived through factory testing and/or computer modeling (FIG. 11). By way of example, performance testing of heat exchanger 24 may be conducted through the injection of particulates into heat exchanger 24. Temperature sensor 40 may be controlled via control unit 12 so as to thermostat inlet air 18 prior to introduction into ASM inlet filter 26. As such, comparing temperature sensor data from temperature sensor 36 (air prior to entering heat exchanger 24) and temperature sensor 40 (air after conditioning within heat exchanger 24) may indicate heat exchange efficiency of heat exchanger 24. As such, the rate of heat exchanger contamination can be converted into an estimate of remaining operating hours of heat exchanger 24. Such an estimate may also compensate for additional aircraft flight profile information and an estimated particulate loading rate expectation. The efficiency of heat exchanger 24 may be monitored continuously during flight operations, with a heat exchanger test occurring at least once a flight during a specific flight phase occurring after the input conditions are determined to be sufficiently stable as described above.

As shown in FIG. 11, heat exchanger 24 performance may be evaluated through comparing temperature sensor data from temperature sensor 36 and temperature sensor 40 to determine heat exchange efficiency 128. A threshold pass/fail value for a minimum allowable efficiency 130 may be predetermined and may be system and use specific. OBIGGS control unit 12 may record, store and compare temperature data and calculated efficiency data 128 and generate empirical curve fit 132 as dictated by heat exchanger performance equation 126. Extrapolating empirical curve fit 132 may allow for an estimation of the remaining operating hours of heat exchanger 24 before performance will exceed the threshold pass/fail value 130, at which point heat exchanger 24 may be repaired or replaced.

Figure 12:
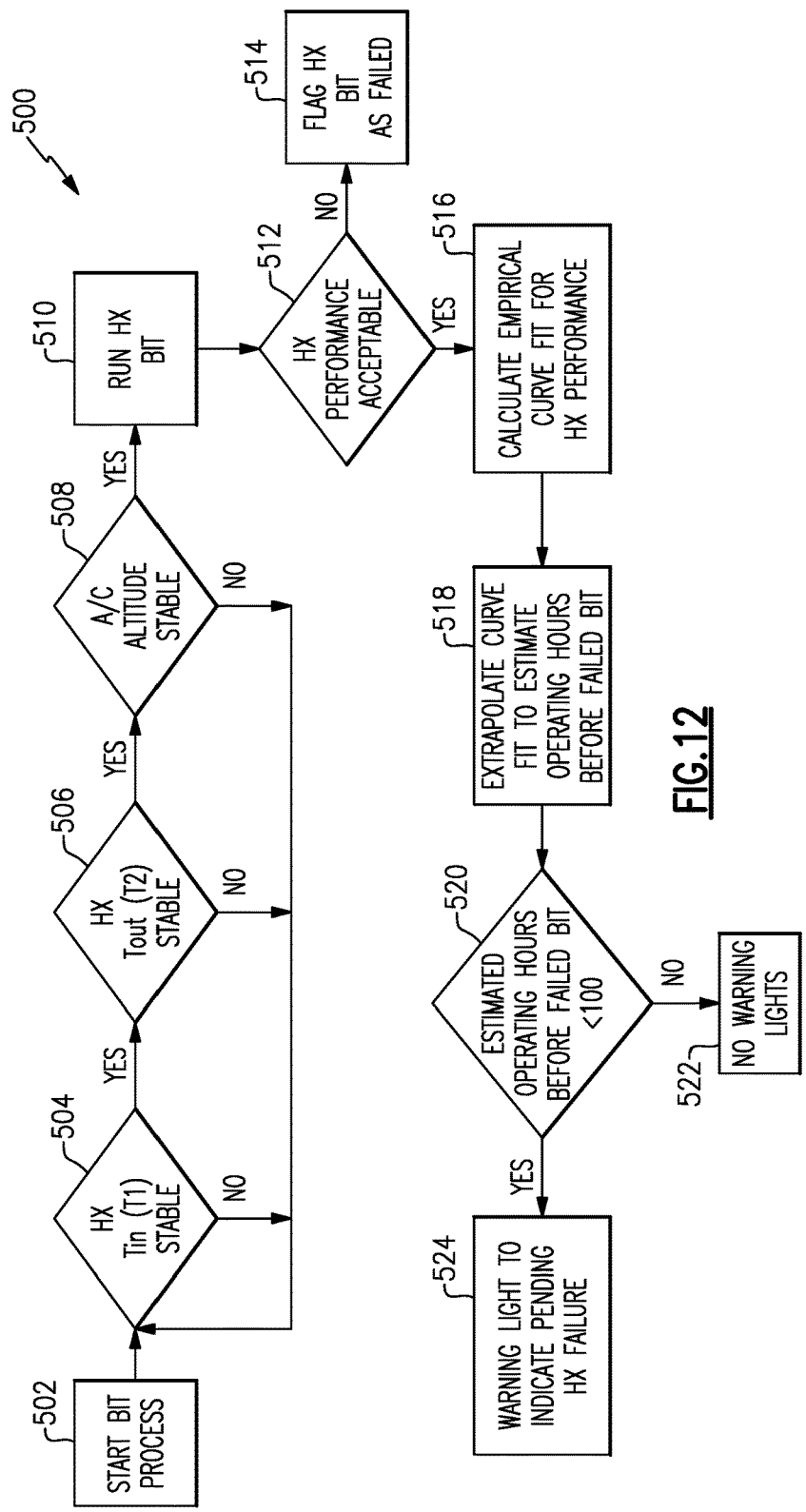
FIG. 12 is a flow diagram of an embodiment of an algorithmic method for a heat exchanger test protocol.

Turning now to FIG. 12, an exemplary flow chart of an algorithm 500 that may be incorporated into control unit 12 to conduct heat exchanger BIT testing is shown. As shown, at step 502, control unit 12 may initiate the test condition of heat exchanger 24. At step 504, control unit 12 may interrogate data received from inlet temperature sensor 36 (FIGS. 1 and 3) to determine if the inlet air temperature is sufficiently stable. If the inlet air temperature is determined to be unstable, control unit 12 may return to the beginning of step 504. If inlet air temperature is determined to be sufficiently stable, control unit 12 will move to step 506. At step 506, control unit 12 may interrogate data received from outlet temperature sensor 40 to determine if the outlet air temperature is sufficiently stable as described above. If the inlet air temperature is determined to be unstable, control unit 12 may return to the beginning of step 504. If the inlet air temperature is determined to be stable, control unit 12 will move to step 508. At step 508, control unit 12 may interrogate data received from the aircraft's on-board altimeter to determine if aircraft altitude is sufficiently stable. If the aircraft altitude is determined to be unstable, control unit 12 may return to the beginning of step 504. If aircraft altitude is determined to be sufficiently stable, control unit 12 will move to step 510 and initiate BIT testing of heat exchanger 24.

At step 512, control unit 12 may interrogate and compare temperature data received from temperature sensors 36, 40 to determine whether heat exchange efficiency 128 of heat exchanger 24 is within acceptable limits (such as above threshold pass/fail value 130). If heat exchange efficiency 128 is determined to be unacceptable, control unit 12 may flag the heat exchanger BIT as a failure at step 514, thereby signaling heat exchanger 24 failure and indicated need for repair or replacement. However, if heat exchange efficiency 128 of heat exchanger 24 is determined to be acceptable, control unit 12 will move to step 516 and calculate empirical curve fit 132 (FIG. 11) for heat exchange efficiency of heat exchanger 24 as a function of time. At step 518, control unit 12 will extrapolate curve fit 132 to estimate the number of operating hours of heat exchanger 24 before BIT failure (i.e., the length of time from the last measurement until curve fit 132 intersects minimum limit threshold 130). At step 520, control unit 12 may determine if the estimated length of time is less than a predetermined period of time, for instance 100 hours. As an example, if curve fit 132 indicates that there are more than 100 hours remaining before a heat exchanger BIT failure is estimated to occur, control unit 12 will not communicate an alert, such as activating one or more warning lights (step 522). However, if curve fit 132 indicates that there are less than 100 hours remaining before a heat exchanger BIT failure is estimated to occur, control unit 12 will communicate a warning, such as activating one or more warning lights, to indicate a pending heat exchanger failure (step 524). An operator may then repair or replace heat exchanger 24 as appropriate.

While exemplary algorithm instructions for the control unit 12 have been described above and with reference to FIGS. 6, 8, 10, and 12, it will be understood that certain exemplary embodiments may change the order of steps in these instructions or may even eliminate or modify certain steps. Furthermore, each of the steps in the instructions described above and with reference to FIGS. 6, 8, 10, and 12 may be embodied as computer software stored in the computer-readable storage medium (e.g., memory storage) for execution by a computing device (e.g., OBIGGS control unit 12) or may otherwise be referred to as a "module" and/or "program."

The foregoing description of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A system for calculating a maintenance prediction for one or more components in an on-board inert gas generating system (OBIGGS), the OBIGGS components including an ozone converter, heat exchanger, inlet filter, and Air Separation Module (ASM) each fluidly coupled via a flow path, the ozone converter configured to remove ozone gas from an inlet gas received via an inlet valve, the heat exchanger configured to adjust the temperature of the inlet gas, the inlet filter configured to filter at least a portion of contaminants from the inlet gas, and the ASM comprising a hollow-fiber membrane configured to separate constituents within the inlet gas and produce a volume of inert gas for delivery to a downstream fuel tank; the system comprising:
   a. a prognostic health monitoring (PHM) sensor network comprising a plurality of sensors, wherein a respective sensor is coupled to a respective component of the OBIGGS, wherein each respective sensor is configured to output a respective data signal corresponding to a performance condition of the respective component associated with the respective sensor; and
   b. a control unit operatively coupled to each of the components of the OBIGGS and signally coupled to the plurality of sensors of the PHM sensor network, wherein the control unit includes i) a memory configured to store a test condition algorithm associated with the respective component, wherein the test condition algorithm includes an empirical curve fit corresponding to a predicted performance lifetime of the respective component, and ii) a processor configured to analyze the respective data signal to calculate the maintenance prediction for the respective component, wherein the maintenance prediction is calculated by comparing the respective data signal relative to the empirical curve fit to estimate remaining component operating hours before component failure.

2. The system of claim 1 wherein the control unit is configured to generate a notification if the estimated remaining component operating hours is less than a predetermined period of time.

3. The system of claim 1 wherein the control unit is configured to initiate a regeneration sequence if data signals from the respective sensor coupled to the ASM indicate an air separation efficiency below a threshold value.

4. A method for calculating a maintenance prediction for one or more components in an on-board inert gas generating system (OBIGGS), the method comprising:
   a. providing an OBIGGS comprising an ozone converter, heat exchanger, inlet filter, and Air Separation Module (ASM) each fluidly coupled via a flow path, and a prognostic health monitoring (PHM) sensor network comprising a plurality of sensors and a control unit including a memory and a processor, wherein a respective sensor is coupled to a respective component of the OBIGGS, and wherein the control unit is operatively coupled to each of the components of the OBIGGS and signally coupled to the plurality of sensors of the PHM sensor network;
   b. populating the memory with a test condition algorithm, wherein the test condition algorithm includes a respective component performance equation and associated performance empirical curve fit corresponding to component performance lifetime;
   c. through the control unit, receiving a respective data signal corresponding to a performance condition of the respective component associated with the respective sensor;
   d. through the one test condition algorithm, comparing the performance condition to the empirical curve fit to calculate an estimated number of remaining component operating hours for the respective component.

5. The method of claim 4 further comprising:
   e. through the control unit, generating a notification if the estimated number of remaining component operating hours is less than a predetermined period of time.

\* \* \* \* \*